April 7, 1936.   E. REICH   2,036,958
APPARATUS FOR MEASURING POWER FACTOR
Filed Sept. 1, 1933
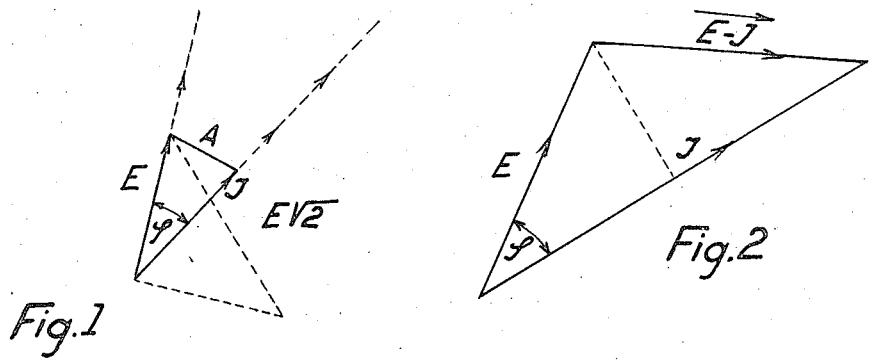
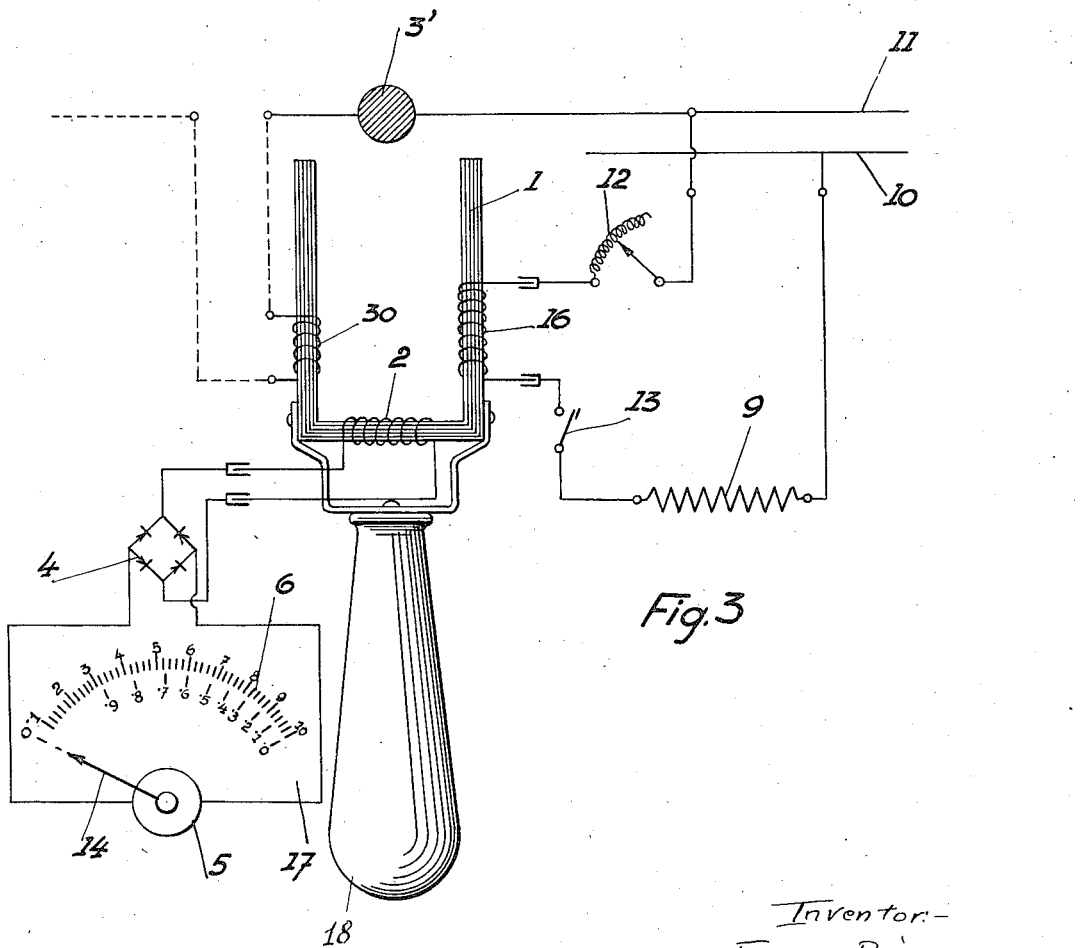

Patented Apr. 7, 1936

2,036,958

UNITED STATES PATENT OFFICE 2,036,958

APPARATUS FOR MEASURING POWER FACTOR

Ernest Reich, Budapest, Hungary

Application September 1, 1933, Serial No. 687,919
In Hungary March 6, 1933

4 Claims. (Cl. 172—245)

The known instruments for measuring the power factor of electrical systems possess the disadvantage that they can be used only within narrow limits of current and voltage.

The present invention, which overcomes this difficulty, relates to an arrangement for measuring the power factor which can be used with currents of unlimited strength as well as with voltages varying within wide limits and enables the measurements to be effected without interrupting the measuring instruments in the conductor.

The essence of the invention is a transformer with open iron core which carries a voltage key which can be connected and disconnected by way of a key and is equipped with a control resistance whereas the secondary coil is connected to a measuring apparatus known per se.

Reference will be made to Figures 1 and 2 of the accompanying drawing for explaining the invention.

Figure 3 shows by way of example the circuit arrangement of a measuring instrument adapted for operation in accordance with the method of the present invention.

If, for example with an electromagnetic measuring instrument in which the magnitude of the magnetic field occasioned by the voltage as well as the field occasioned by the current strength and acting as far as possible on the same measuring system is known, the current strength J and the voltage E operate simultaneously on the measuring instrument, then the pointer of the instrument indicates a vectorial value A (Figure 1) characteristic of the power factor (cos $\phi$) i. e., of the phase displacement between voltage and current.

In order in the present method to obtain a measuring instrument with a good scale division for the power factor (cos $\phi$) it is proposed according to the invention to make either the current vector or the resultant equal to the voltage vector.

The magnitude A is known to be equal to the geometric sum of the vectors E and J. According to the known formula $$A = E\sqrt{2(1-\cos\phi)}$$

In this case there is a quadratic relationship between A and cos $\phi$. This equation may be deduced trigonometrically from right triangles. Consider an isoceles triangle with the two equal sides of known value E, and with the included angle $\phi$ also known, the third leg, A, being unknown. To find A, use is made of the half angle $\phi/2$, from which, by right triangles, we find that:

$$\sin \phi/2 = A/2E$$

therefore $$A = 2E \sin \phi/2$$

For sin $\phi/2$ substitute its equal $$\sqrt{\frac{1-\cos\phi}{2}}$$

whence, $$A = 2E\sqrt{\frac{1-\cos\phi}{2}} = E\sqrt{\frac{4(1-\cos\phi)}{2}} = E\sqrt{2(1-\cos\phi)}$$

$$\therefore A = E\sqrt{2(1-\cos\phi)}$$

Naturally the vectorial addition can also be effected according to Figure 2 in such manner that to the vector E is added a resultant of equal magnitude $A = E - J$ where $J = 2E \cos \phi$. In this case there is a linear relationship between J and cos $\phi$. It is also apparent from this formula that it is more advantageous to operate with vectors E and J of the same magnitude, i. e., to add magnetic fields of the same magnitude.

The measuring instrument based on the method according to the invention is provided with regulating and switching devices for adjusting the vectors E and J to predetermined magnitudes independently of one another and then to allow the two vectors to operate simultaneously.

Figure 3 shows by way of example one embodiment of such an invention which in principle corresponds for example to the instrument described in U. S. Patent No. 1,929,714 and permits the power factor to be measured without interrupting the conductor.

I is a transformer with an open iron core on which are carried the primary coil 16, the secondary coil 2, and an auxiliary coil 30. The primary coil 16 can be connected by way of a controlling resistance 12 and a series resistance 9 to the main supply 10, 11 by closing a key 13. Connected to the secondary coil 2 is a rectifier 4 to which on the other side is connected a measuring instrument 5 calibrated for the current flowing in the conductor 3 and the pointer 14 of which travels over the scale 6.

The actuation and mode of operation of the instrument according to the invention is as follows:—

First the voltage vector E is formed. For this purpose the variable resistance 12 is so adjusted that, on operating the key 13, the pointer 14 swings to the division $$10/\sqrt{2}=7.1$$

of the scale 6 divided in 100°. On releasing the key the pointer returns to zero because the voltage field in the iron core has again dropped to zero.

Then the current vector J is formed. For this purpose the iron core 1 is moved relatively to the conductor 3' in any desired manner as by a handle 18, and to such an extent that in the iron core a field of the same strength occurs as the current field and the pointer 14 under the influence of the current vector gives the same throw (division 7.1). In order to add the two vectors of equal magnitude the key 13 is depressed and thereby the field of the voltage and current vectors in the iron core 1 are added vectorially and the pointer 14 positions itself in accordance with the resultant.

In order to be able to read this off directly, a cosine scale is provided for example beneath the scale 6 and in Figure 3 is indicated by 17. The scale is constructed in accordance with the above formula, E being expressed in scale divisions.

In order to be able to utilize the scale completely it is found to be advantageous to make the voltage vector equal to $10/\sqrt{2}$.

The magnetic field induced in the iron core 1 is in phase with the current vector flowing through the conductor 3'. In consequence of the coil 16, however, the field induced in the iron core 1 is displaced in phase with respect to the voltage so that the theoretical scale does not correspond with the calibrated scale. However, in consequence of the magnitude of the series resistance 9, the deviation is so small that in practice it can be neglected. However, this also is not necessary because in carrying out the method in practice, vectors of predetermined magnitude and of equal magnitude are formed and added. Consequently the field of the primary coil 16 is displaced or altered by a constant angle with respect to the voltage so that the calibrated cosine scale always indicates the correct value.

If with the above instrument the power factor is to be measured with a current strength lying beneath 7.1 amperes then a coil 30 is positioned on the iron core 1 and the number of turns is chosen in such a way that even with loads of the order of magnitude of milliamperes it is possible for the same instrument to measure current strength, voltage and power factor.

Preferably the key 13 is combined structurally with the rotary contact arm of the regulating resistance 12 to form a rotary push-button (Figs. 4 and 5). The voltage vector is adjusted by rotating the depressed push-button until the pointer 14 has attained a predetermined scale division whereupon on releasing the push-button the voltage is disconnected. After adjustment of the current vector in the manner described above and again depressing the push-button, the power factor can be read off.

On measuring the power factor according to the formula $J=2E \cos \phi$ the voltage vector is preferably adjusted to the scale division 50 by including in circuit a correspondingly large resistance 12 and with the key 13 depressed the iron core 1 is moved towards the conductor 3' by suitable means such as the handle 18 until the pointer 14 is set to the same throw 50, whereupon on releasing the key the power factor can be read off. This latter method has the advantage that a special scale is not necessary for reading off the power factor and the scale of current strength can be used for this purpose.

The apparatus according to the invention affords the advantage that the instruments indicate correctly independently of the periodicity and the existence of foreign fields because these have the same influence on the current and voltage vectors. Thus the influence of the foreign fields is eliminated in the resultant.

Also it is extremely advantageous that according to this invention the scale does not have to be calibrated for $\cos \phi$ but simply calculated according to the formula $$A = E\sqrt{2(1-\cos \phi)}$$

and is drawn to the scale of the scale calibrated for current. It is possible at any moment to verify that the scale thus obtained is correct in that on measuring according to the formula $J=2E \cos \phi$ the same result must be obtained.

According to this formula no scale is needed for reading off the value of $\cos \phi$ because if the pointer assumes the position 40 during measurement then this is simply read off as $\cos \phi = 0.4$.

What I claim is:

1. An instrument for measuring the power factor of an alternating current circuit, comprising an open iron core transformer, a voltage coil on said core in circuit with a resistance and a contact key and placed across the circuit to be measured, a secondary coil on said transformer, a measuring device, the voltage coil and its variable resistance permitting the establishment of a magnetic field of desired value, proportional to the voltage, and means for bodily moving the transformer towards one of the conductors of the circuit to be measured, for adjusting the magnetic field due to the current in the said circuit to the said desired value, and a key normally open, for closing the voltage circuit as desired, so that the two magnetic fields, after they have been separately established, may be impressed simultaneously on the measuring device.

2. A measuring device according to claim 1, in which a rectifier is disposed between the secondary coil and the measuring instrument.

3. A measuring device according to claim 1, including an auxiliary coil in series with the circuit to be measured and slidable on and removable from the transformer, when small currents are to be measured.

4. A measuring device according to claim 1, in which the key in circuit with the voltage coil and the armature of the variable resistance thereof are structurally combined as a single unit.

ERNEST REICH.